Jan. 30, 1962 J. L. SANBORN 3,019,349

SUPERCONDUCTOR CIRCUITS

Filed March 30, 1960

2 Sheets-Sheet 1

INVENTOR
JERE L. SANBORN

BY John E. Dougherty Jr.
ATTORNEY

Jan. 30, 1962 J. L. SANBORN 3,019,349

SUPERCONDUCTOR CIRCUITS

Filed March 30, 1960

2 Sheets-Sheet 2

3,019,349
SUPERCONDUCTOR CIRCUITS
Jere L. Sanborn, Poughkeepsie, N.Y., assignor to International Business Machines Corporation, New York, N.Y., a corporation of New York
Filed Mar. 30, 1960, Ser. No. 18,643
19 Claims. (Cl. 307—88.5)

The present invention relates to superconductor devices and, more particularly, to improved superconductor devices including a plurality of intercoupled circuits which provide positive latching, one for the other, which are capable of responding to applied inputs in accordance with logical combinations of these applied inputs, and which may be fabricated in thin film form in such a manner as to be capable of being checked for shorts at room temperature.

Superconductor circuits have been developed which are capable of performing most, if not all, of the functions required in computing and data processing systems. In order to achieve high speed of circuit operation as well as minimization of size and economy in fabrication, superconductor circuits are now fabricated in the form of thin planar films laid down preferably by vacuum deposition techniques on a suitable substrate. Examples of thin film devices are shown and described in copending applications Serial No. 625,512, filed November 30, 1956, in behalf of R. L. Garwin and assigned to the assignee of the subject application, and Serial No. 765,760, filed on October 7, 1958, in behalf of J. L. Anderson and assigned to the assignee of the subject application.

Typical of the superconductor circuits of the prior art are what are termed the cross coupled flip flop and the non-cross coupled flip flop. Each of these flip flop circuits includes first and second superconductive current paths connected in parallel across a current source. Each also includes input superconductive gating devices for selectively introducing resistance in these paths to cause the circuit to assume first and second different stable states. Each circuit is in a first stable state when the current from the source is in one of the parallel paths and in its second stable state when the current from the source is in the other of the parallel paths. The non-cross coupled flip flop is completely superconductive when in either of its stable states. Once the current has been established in one of the paths and the other path is allowed to become superconductive, the current remains stable in the path it is in since there is no means, such as resistance in the path carrying the current, to produce a current shift. In the cross coupled flip flop the circuit includes resistance in one or the other of the parallel paths when it is in either of its stable states. This resistance is introduced by a pair of cross coupled cryotrons, each of which has its control conductor connected in one parallel path and its gate conductor connected in the other parallel path. This latter circuit is advantageous in that it is capable of reliable operation even though some small amounts of resistance may be present in one or both of the paths. However, though the cross coupled circuit of the prior art provides a positive latching, it has a disadvantage in that, when it is fabricated in thin film form, it is very difficult to test the circuit for shorts, which may exist, for example, between the control and gate conductors of the cross coupling cryotrons which necessarily traverse each other and are separated only by a thin layer of insulating material.

In accordance with the principles of the present invention, improved superconductive devices are constructed which provide positive latching to hold the devices stable with current in any one of a number of parallel paths and which are capable of being tested for shorts at room temperature by a simple continuity check. As is illustrated in the embodiments of the invention disclosed herein, these devices include first and second superconductive circuits, each including a pair of superconductive paths connected in parallel circuit relationship with respect to a current input terminal for that circuit. Coupling between the circuits is provided by a number of superconductive gating devices, each of which has its control conductor connected in one circuit and its gate conductor connected in the other circuit so that when each circuit assumes either stable state, the current flows in a particular path in each circuit and resistance is introduced in the other path of that circuit under control of the current in the other circuit. In this way, each circuit positively latches the other circuit. Since the paths of the circuits are electrically insulated one from the other and the superconductive gating devices each have their control and gate conductors connected in different circuits, the device may be tested for shorts at room temperature by a simple continuity test. Further, since the current paths of the two circuits are not necessarily electrically connected one to the other, they may receive their current from different current sources. Therefore, the supply current factor of the cryotrons which receive control conductor current from one source may be changed merely by changing the magnitude of the current supplied by that source without in any way affecting the supply current factor of the cryotrons which receive their control conductor current from the other source. By the term supply current factor is meant the ratio of the total current supplied to the circuit including the cryotron control conductor to the current required by the control conductor to drive its gate conductor resistive. These improved bistable devices including two intercoupled superconductive circuits are capable of responding to applied inputs in accordance with different logical combinations of the inputs. Thus, as is disclosed herein, the device may be designed to respond to change from one stable state to the other stable state only when inputs are applied to introduce resistance simultaneously into each of the cross coupled circuits. A plurality of devices constructed in this manner are arranged in a further embodiment to form a portion of a memory array in which the devices are selectively operated by a coordinate addressing arrangement of inputs and selection lines. When a system employing a plurality of such devices is fabricated, each of the first circuits of the devices may be connected in series to provide a first network and each of the second circuits connected in series to provide a second network electrically insulated from the first network. The entire system may be checked for shorts by a simple continuity check made between any point in one network and any point in the other network.

Therefore, it is an object of the present invention to provide improved superconductor devices.

It is a further object to provide superconductor bistable devices which are positively latched in their different stable states and which, when fabricated in thin film form, may be tested for shorts at room temperature.

It is a further object to provide improved superconductive devices each including a pair of intercoupled superconductive circuits to each of which inputs are applied selectively, wherein the circuit responds in accordance with logical combinations of the applied inputs.

A still further object is to provide an improved superconductive bistable device including a pair of superconductive circuits which responds to change its state only when predetermined combinations of inputs are applied.

Still a further object is to provide a device of the above described type wherein separate current supply means are utilized to supply current to each of the two intercoupled circuits forming the device so that the supply current factor for certain of the cryotrons in the circuit is capable of being changed without affecting the supply current factor of the other cryotrons in the circuit.

Still another object is to provide a superconductor system including a plurality of superconductive devices of the above described type, wherein the circuits forming these devices are connected in first and second different networks which may be checked completely for shorts at room temperature by a simple continuity check.

The foregoing and other objects, features and advantages of the invention will be apparent from the following more particular description of preferred embodiments of the invention, as illustrated in the accompanying drawings.

In the drawings:

FIG. 1 is a schematic representation of a cross coupled flip flop circuit of the prior art constructed in thin film form.

FIG. 1*a* illustrates the symbolic representation of a superconductive gating device, which is used in the other figures.

Figures 1, 1A, 2, 3:
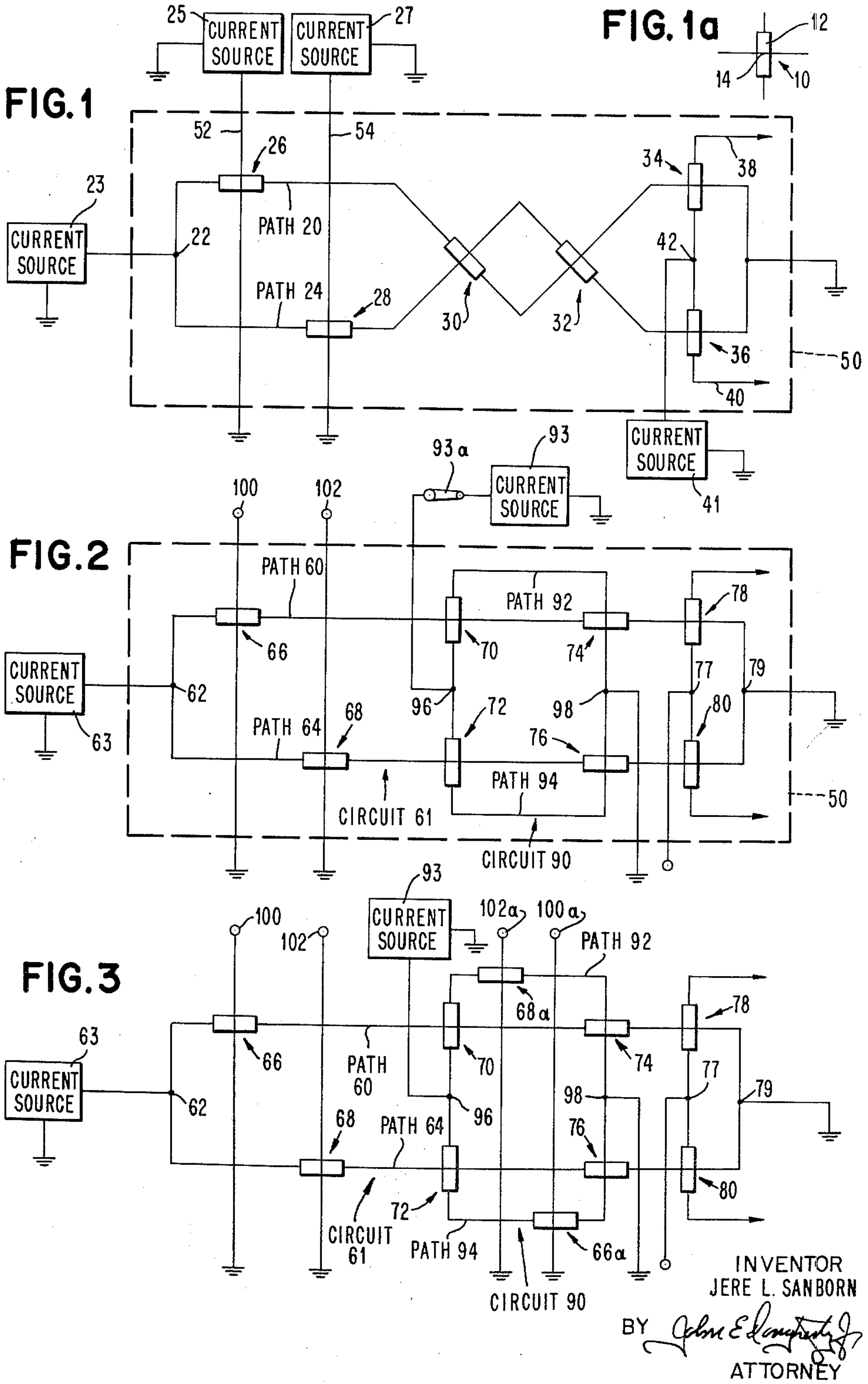
FIG. 2 shows one embodiment of an improved superconductive bistable device constructed in accordance with the principles of the present invention.
FIG. 3 shows a further embodiment of a circuit constructed in accordance with the principles of the present invention which is capable of responding differently to different logical combinations of a plurality of inputs.

Referring now to the figures in detail, FIG. 1 shows a superconductor circuit constructed in accordance with the principles of prior art. This circuit includes a number of cryotrons each of which is represented by the symbol shown in FIG. 1*a*. The gate conductor of a cryotron 10 shown in FIG. 1*a* is represented by the rectangular block indicated at 12 and the control conductor by the line 14 which traverses the gate. In operation the state of the gate conductor 10, superconducting or resistive, is controlled by applying signals to the control conductor 12. The gate is superconducting in the absence of a signal on the control conductor and resistive when a signal is applied to the control conductor.

In the circuit of FIG. 1 there is shown what is generally termed a cross-coupled flip flop circuit. This circuit includes two paths 20 and 24 which are arranged in parallel with respect to a current input terminal 22 to which a current source 23 is connected. The circuit includes six cryotrons which are designated 26, 28, 30, 32, 34 and 36. Cryotrons 26 and 28 are input or set cryotrons. The gate of cryotron 26 is connected in path 20 and the gate of cryotron 28 is connected in path 24. Signals are applied to the control conductors of set cryotrons 26 and 28 by current sources 25 and 27 to switch the circuit of FIG. 1 between its two stable states. Cryotrons 30 and 32 are what are termed cross coupling cryotrons in that each has its gate connected in one of the parallel paths 20 or 24 and its control conductor connected in the other parallel paths. The bistable states of the circuit of FIG. 1 are represented by the presence of the current from the source in one or the other of the parallel paths 20 or 24. When the circuit is in its first stable state with the current in path 20, this current flows through the gate conductor of cryotron 30 and the control conductor of cryotron 32. The gate conductor of this latter cryotron is maintained resistive and since this gate conductor is connected in path 24, the circuit is maintained stable with the current from the source in path 20. Similarly, when the circuit is in the second stable state with the current in path 24, the gate of cryotron 30, which is connected in the other path 20 is maintained resistive.

Cryotrons 34 and 36 are output cryotrons for the circuit. The control conductor for cryotron 34 is connected in path 20 and the control conductor for cryotron 36 is connected in path 24. When the circuit is in its first stable state, with current in path 20, the gate of cryotron 34 is resistive and the gate of cryotron 36 is superconducting. When the circuit is in its other bistable state, the state of each of these cryotrons is reversed. The gates of the output cryotrons are shown connected in an output circuit that includes two paths 38 and 40. These paths extend in parallel from a current input terminal 42 which receives current from a source 41. The current applied at this input terminal is directed to one or the other of these paths in accordance with the state of the circuit of FIG. 1.

When the circuit of FIG. 1 is laid down in thin film form, each cryotron gate conductor is a thin planar film of superconductive material and each control conductor is also a thin planar superconductive film arranged to traverse the gate conductor. The two films forming the cryotron are separated by a layer of insulating material. In order to achieve high speeds of operation, the films forming the gate conductor, control conductor and layer of insulation therebetween are extremely thin, that is, in the order of 10,000 angstroms or less. One problem which arises in fabricating such circuits is that of the shorts between the control and gate, which necessarily traverse each other, as well as between the portions of different circuits which, because of the circuit pattern also must cross one above the other and are separated by only a thin layer of insulating material. Thus, for example, examining the circuit of FIG. 1, it can be seen that a layer of insulating material is required between the control and gate conductors of each of the cryotrons 26, 28, 30, 32, 34 and 36.

It is not possible with the circuit configuration shown, to check the circuit completely for the presence of shorts at room temperature. The circuit is shown in FIG. 1 as embraced by a rectangle 50 which indicates the portion of the circuit which is laid down in thin film form on a backing or substrate before the connections are made to the terminals of the current sources. A short between the gate and control conductors of cryotrons 26 or 28 may be detected by connecting a meter between terminal 22 and line 52 in which the control conductor for cryotron 26 is connected and then between the same terminal and line 54 in which the control conductor of cryotron 28 is connected. Similarly, cryotrons 34 and 36 may be checked for shorts by connecting a meter to test for continuity between terminal 22 and the leads 38 and 40 to which the gate conductors of these cryotrons are connected. However, since both the control and gate conductors of the cross coupling cryotrons 30 and 32 are connected in the same circuit, it is not possible to check these cryotrons for shorts in this way. Thus, for example, if the leads of a meter are connected to any two points in the bistable circuit defined by paths 20 and 24, continuity will be observed regardless of whether a short exists in one or both of the cryotrons 30 and 32 since the control conductors and gate conductors of these cryotrons are connected in paths which are electrically connected to each other.

FIG. 2 is a diagrammatic illustration of a circuit constructed in accordance with the principles of the present invention wherein the entire circuit may be checked for shorts with simple meter tests for continuity, which may be made at room temperature. The circuit of FIG. 2 is similar to that of FIG. 1, in that it includes a circuit 61 having two current paths 60 and 64 connected in parallel between terminals 62 and 79 to which the terminals of a current source 63 are connected. The circuit includes eight cryotrons designated 66, 68, 70, 72, 74, 76, 78 and 80. Cryotrons 66 and 68 are the input cryotrons employed to switch the bistable circuit between its stable states. Thus, for example, if it is desired to switch the current to path 60, the control conductor for cryotron 68 is energized and, if it is desired to switch the current to path 64, the control conductor for cryotron 66 is energized. Cryotrons 78 and 80 are the output cryotrons and are connected in an output circuit similar to that shown in FIG. 1. Cryotrons 70, 72, 74 and 76 are connected in a separate circuit which is here termed a latching circuit and generally designated 90. This circuit includes two paths 92 and 94 which extend between two current terminals 96 and 98. The latching circuit may also be considered to be a bistable circuit in which the current input supplied at terminal 96 from a source 93 is maintained stably in either path 92 or 94. Path 92 includes the gate conductor for cryotron 70 and the control conductor for cryotron 74, and path 94 includes the gate conductor for cryotron 72 and the control conductor for cryotron 76. The latching circuit 90 is coupled to the bistable circuit since the control of cryotron 70 and the gate of cryotron 74 are connected in path 60 of the bistable circuit 61 and the control conductor of cryotron 72 and the gate conductor of cryotron 76 are connected in path 64 of bistable circuit 61.

From the connections shown, it can be seen that when the bistable circuit 61 is in a stable state, here considered to be a binary one state, with the current from terminal 62 flowing through path 60, the current in path 60 maintains the gate of cryotron 70 resistive. Since there is no current in path 64, the gate of cryotron 72 is at this time superconducting. Therefore, the current input at terminal 96 is directed entirely through path 94 at terminal 98. The current in this path flows through the control conductor of cryotron 76, maintaining the gate conductor of this cryotron resistive. This gate conductor is connected in path 64 and, being in a resistive state, positively maintains the bistable circuit 61 stable in its binary one state with all of the current in path 60. Similarly, the current in path 60 holds the gate of cryotron 70 resistive to positively hold the latch circuit stable with all of the current from source 93 in path 94. The circuit may be switched to its other stable state, which is termed the binary zero state, by energizing the control conductor for cryotron 66 to drive the gate of this cryotron resistive and switch the current from source 63 to path 64. When the current has been switched to this path, it can be seen that the gate of cryotron 70 becomes superconducting and that of cryotron 72 becomes resistive so that the current in the latch is now directed through path 92 and the control conductor for cryotron 74. Thus, with the circuit in the binary zero state and current in paths 64 and 92, the gate conductor of cryotron 74 is resistive to positively hold the bistable circuit 61 stable and the gate conductor of cryotron 72 is resistive to positively hold the latch circuit 90 stable.

In the circuit of FIG. 2, the supply current factor of the cryotrons 70, 72, 74 and 76 must be within certain predetermined limits. The term supply current factor, as stated above, is the ratio of the supply current to the actual current required by a control conductor to drive its gate conductor resistive. Thus, for example, if we assume that 10 units of current are applied by source 63 to the bistable circuit 61 and that 5 units of current are required by the control conductors of cryotrons 70 and 72 to drive the gates of these cryotrons resistive, the supply current factor of these cryotrons is said to be two. If only one-third of the current supplied by source 63 is required by the control conductors of cryotrons 70 and 72 to drive the associated gates resistive, the supply current factor is said to be three. Similarly, if one-half the current supplied by current source 93 to the latching circuit 90 is necessary to enable the control conductor of cryotrons 74 and 76 to drive the associated gates resistive, the supply current factor of these cryotrons is said to be two, and when only one-third of the current supplied by source 93 is required by these control conductors, the supply current factor is said to be three.

The circuit of FIG. 2 may be operated with each of the cryotrons 70, 72, 74 and 76 having a supply current factor between two and three. This mode of operation may be understood by a consideration of the manner in which the cryotrons are switched when, with bistable circuit 61 in its binary one state, a signal is supplied to a binary zero input terminal 100 to drive the gate of cryotron 66 resistive. Prior to the application of the signal to this terminal, the current in the bistable circuit is in path 60 so that the gate of cryotron 70 is resistive and that of cryotron 72 is superconducting. The latching circuit current supplied by source 93 is, therefore, directed through path 94 and there is no current in path 92. As a result, the gate of cryotron 76 is now resistive and the gate of cryotron 74 is superconducting. When a pulse is applied at terminal 100, the gate 66 is driven resistive. This gate is connected in path 60 and since, at this time the gate of cryotron 76 is maintained resistive by the current in path 94, there is equal resistance in each of the paths 60 and 64. The current, therefore, tends to shift from path 60 to path 64 towards a condition of equal current in each path. However, before this condition is reached, when a portion of current between one third and one half has been shifted from path 60 to path 64, the gate of cryotron 72 is driven resistive. When this occurs, the resistances in paths 92 and 94 of the latching circuit are equal so that the current tends to shift in the latching circuit from path 94 to path 92 towards a condition of equal current in each path. When a sufficient amount of current, between one third and one half, has been shifted to path 92, the gate of cryotron 74 is driven resistive so that the resistance in path 60 of the bistable circuit 61 is now twice that of the resistance in the path 64. Thus, the current shift in the bistable circuit now proceeds towards a point at which there is two-thirds of the current from the source in path 64 and only one-third in path 60. When this condition is approached, the current in path 62 is insufficient to maintain the gate of cryotron 70 resistive, whereas, the current in path 64 continues to maintain the gate of cryotron 72 resistive. Therefore, the latching circuit begins to switch to a condition with the entire current from source 93 in path 92. As a result, the gate of cryotron 76 becomes superconducting and there is no longer any resistance in path 64. The entire current in the bistable circuit is then switched into this path.

The operation described above may be summarized as follows:

(1) Initially the current in the bistable circuit is in path 60 and the gate of cryotron 76 in path 64 of the bistable circuit is the only resistance then present in this circuit. At this time, the current in the latching circuit is in path 94 and the only resistance in this circuit is the resistance of gate 70.

(2) When gate 66 is driven resistive, each of the paths 60 and 64 of the bistable circuit 61 has the same resistance and the current shifts so that there is one half of the supply current in each path.

(3) This current shift in the bistable circuit causes gate 72 of the latching circuit to be driven resistive and the latching circuit, therefore, undergoes a current shift so that the current in each of the paths 92 and 94 is equal.

(4) The switching of the current in the latching circuit to path 92 drives gate 74 resistive, so that now the resistance in path 60 of the bistable circuit is twice that in path 64, causing the current to continue to shift in the bistable circuit towards a condition with two-thirds of the current in path 64 and one-third in path 60.

(5) As this current shift is taking place, the gate of cryotron 70 becomes superconducting, and the only resistance remaining in the latching circuit is that of the gate of cryotron 72 so that, in this circuit, a current shift is initiated to direct the entire current to path 92.

(6) As this occurs, the gate of cryotron 76 becomes superconducting so that there is no longer any resistance in path 64 of the bistable circuit and the entire current is directed by the resistive gates of cryotrons 66 and 74 to path 64.

The circuit of FIG. 2 may also be operated with the supply current factor of cryotrons 74 and 76 between one and two and the supply current factor of cryotrons 70 and 72 greater than two and not necessarily less than three. The operation of the circuit, when cryotrons have a supply current factor in these ranges are employed may be understood by a consideration of the switching of the circuit from its binary zero to its binary one state by applying a pulse at terminal 102 at a time when the current in the bistable circuit 61 is entirely in path 64. Prior to the application of the pulse at terminal 102, the current in the latching circuit is in path 92 so that the gate of cryotron 74 is maintained resistive to hold the bistable circuit 61 stable in its binary zero state. Similarly, with the current in path 64, the gate of cryotron 72 is maintained resistive to ensure the stability of the latching circuit. When the gate of cryotron 68 is driven resistive, the operation is similar to that above, in that, at this time, there is equal resistance in paths 60 and 64 (gates of cryotrons 74 and 68) and the current in the bistable circuit shifts toward a balanced condition between paths 60 and 64. At a time during this current shift which depends upon how much greater than two the supply current factor of the cryotrons 70 and 72 is, the gate of cryotron 70 is driven resistive. When the gate of this cryotron is driven resistive, there is equal resistance in the paths 92 and 94 of the latching circuit and the current in this circuit begins to shift from path 92 to path 94 to a condition of equal current in each path. When this current distribution has been achieved, in the latching circuit, the gates of both of the cryotrons 74 and 76 are superconducting, since each has an operating gain less than two. Therefore, when the current has been switched to a balanced condition in the latching circuit 90, the only resistance remaining in the bistable circuit 61 is the resistance of gate 68 and, thus, the current shift is continued in this circuit until the entire current is shifted to path 60 so that the bistable circuit is in its binary one state. As this current shift occurs, the gate of cryotron 72 becomes superconducting and the only resistance remaining in the latch circuit is that of the gate of cryotron 70 so that the entire current in the latch circuit is directed from terminal 96 to path 94. This current passes through the control conductor of cryotron 76 and drives the gate of this cryotron resistive to maintain circuit 61 in its binary one state with the entire current from source 63 in path 60.

It is, of course, obvious that it is not necessary that the output cryotrons 78 and 80 have their control conductors connected in the bistable circuit 61. The output circuit might have its control conductors, that is, control conductors having gates similar to gates 78 and 80, connected in the paths 90 and 92 of the latching circuit. The only difference in operation which results from taking the output from the latching circuit 90 instead of bistable circuit 61 is in the time at which the output gates undergo changes in state. Further, it is also within the scope of the invention to include control conductors for different output cryotrons in both the latching circuit 90 and bistable circuit 61, in which case, even though the output cryotrons exhibit the same supply current factor, the state of the output gates controlled by the two circuits undergo changes in state at different times after an input pulse is applied.

The circuit of FIG. 2 may be checked for shorts between the control and gate conductors of any of the cryotrons, merely by continuity checks made at room temperature. Shorts in the input cryotrons 66 and 68 may be checked merely by continuity checks made between terminals 100 and 62 and 102 and 62. Similarly, the output cryotrons 78 and 80 may be checked by using a meter to check for continuity between the lines in which the gates of these cryotrons are connected and any point in the bistable circuit 61. The cryotrons 70, 72, 74, and 76 which couple the bistable circuit 61 and the latching circuit 90 may be checked for shorts merely by running a continuity check between any point in the latching circuit and any point in the bistable circuit. Thus, for example, a continuity check may be made between points 62 and 96 and unless there is a short in one of the cryotrons 70, 72, 74 and 76, or between the leads connected to the current terminals of the latching circuit which traverse paths 60 and 64 of the circuit 61, no continuity will be observed. If a short exists at one or more of the points at which the conductors forming these circuits traverse each other, continuity will be observed between terminals 62 and 96.

One important feature of the circuit of FIG. 2 is that since the latching circuit 90 and the bistable circuit 61 are electrically insulated one from the other, each may receive current from a different current source. Since the supply current factor of each of the cryotrons employed is dependent upon the portion of the supply current fed to the control conductor of a cryotron which is necessary to drive the gate conductor resistive, the supply current factor of the cryotrons in the circuit may be changed by changing the magnitude of the supply current for either the latching circuit or the bistable circuit. Thus, for example, the circuit may be operated as described above with identical cryotrons operated at the same supply current factor between two and three by having sources 63 and 93 supply the same amount of current. In such a case, it is, of course, possible to connect the current output terminal 77 of bistable circuit 61 to the current input terminal 96 of the latching circuit 90. However, the circuit can be changed to be operated in accordance with the second mode described above, where two separate current sources are applied, merely by lowering the current fed to the circuit by source 93. Since the control conductors of cryotrons 70 and 72 receive their current from source 63, their supply current factor remains the same, that is, between two and three. However, the control conductors of cryotrons 74 and 76 receive their current from source 93. By decreasing the magnitude of this current sufficiently, the supply current factor of these cryotrons may be reduced to a value between two and one without in any way affecting the supply current factor of cryotrons 70 and 72.

The speed of operation of the circuit of FIG. 2 may be increased by interrupting the latching current supplied by source 93 each time an input signal is applied at terminals 100 or 102. The latching current is reapplied after the input signal has been on for a time sufficient to switch enough current in the bistable circuit 61 to cause the states of both of the cryotrons 70 and 72 to change. This momentary interruption of the latching circuit is effected by operating the switching device such as that schematically illustrated at 93*a*. By interrupting the current from source 93 when an input signal is applied at either terminal 100 or 102, the resistance of the gate of either cryotron 74 or 76, according to the state of the circuit, is removed from the bistable circuit 61 and the only resistance present in the circuit is that of either gate 66 or 68. The current switching in circuit 61 then takes place at a much faster rate since the current tends to switch entirely from one path to the other path. When a sufficient amount of this current has been switched at this high rate to cause the state of both of the cryotrons 70 and 72 to change, the current source 93 re-applies current to circuit 90. This current is directed into one or the other of the paths in circuit 90, in accordance with which of the cryotrons 70 and 72 is now resistive, and drive an appropriate one of the cryotrons 74 and 76 into a resistive state. In this way, further resistance is added in the one of the paths 60 or 64 of circuit 61 from which current is being switched and the rate of switching current in this path is increased.

When the circuit is operated in this mode with the supply current for the latch circuit interrupted each time an input pulse is applied, each of the coupling cryotrons 70, 72, 74 and 76 may have supply current factor between one and two.

The circuit of FIG. 3 is similar to that of FIG. 2, differing only in that two additional set cryotrons, 66a and 68a, have been connected in the circuit. These set cryotrons are connected with their gates connected in paths 92 and 94 of the latching circuit 90. The remaining components of the circuit are the same as that of FIG. 2 and, for this reason, the same designations are employed to identify like components in FIGS. 2 and 3. The control conductors of the added set cryotrons 66a and 68a are connected to a pair of input terminals 100a and 102a. The circuit of FIG. 3 is selectively switched between its two different stable states in response to combinations of input pulses applied to terminals 100, 102, 100a and 102a. In order to achieve this type of operation, the cryotrons 70, 72, 74 and 76 are operated at a supply current factor of between one and two. In this type of arrangement, the circuit is switched from its binary one to its binary zero state, that is, from the state with current in the path 60 to the state with current in path 64, when pulses are simultaneously applied at input terminals 100 and 100a. An input pulse applied to one or the other of these input terminals is ineffective to change the state of the circuit. Similarly, the circuit is switched from its binary zero to its binary one state by simultaneously applying pulses at terminals 102 and 102a. A pulse applied to either one or the other of these two terminals, exclusively, is ineffective to change the stable state of the circuit.

The operation is best understood by a consideration of the manner in which the circuit responds when a pulse or pulses are applied to one or more of the input terminals. For example, assume that pulses are simultaneously applied at terminals 100 and/or 100a at a time when the circuit is in its binary one state with currents flowing in paths 60 and 94. If a signal is applied to the input terminal 100, exclusively, the gate of cryotron 66 is driven resistive. With this gate resistive and the gate of cryotron 76 resistive, the current shifts from path 60 to path 64 toward an equilibrium condition with equal current in each path. As this current shift approaches completion, the gate of each of the cryotrons 70 and 72 is superconducting since each has a supply current factor less than two. With both of the gates 70 and 72 superconducting, the entire latching circuit is, at this time, in a superconducting state, but the current remains in the path 94 since there is no means for shifting the current from this completely superconducting path. Therefore, the bistable circuit 61 remains stable in a state with half of the current in path 60 and half of the current in path 64, until the pulse applied at terminal 100 is terminated. At this time the resistive gate of cryotron 76 causes the current in path 64 to shift back to path 60 and the circuit assumes its initial binary one state with the entire current in this path. Similarly, when an input pulse is applied to terminal 100a and not to any other input terminal, the gate of cryotron 66a is driven resistive to cause the current in the latching circuit to shift to approach a condition of equal current in paths 92 and 94. This current shift allows the gate of cryotron 76 to become superconducting but the current shift is not sufficient to allow the control conductor of cryotron 74 to drive its gate resistive, since this cryotron also has a supply current factor less than two. Thus, the only effect of the current shift in the latching circuit is to allow both of the paths 60 and 64 in the bistable circuit 61 to become completely superconducting. In the absence of any resistance in path 60, the current in the bistable circuit 61 remains unchanged and, therefore, when the input pulse is terminated at terminal 100a to allow the gate of cryotron 66a to become superconducting, the resistive gate of cryotron 72 shifts the current in the latching circuit 90 completely back into path 94 and the entire circuit reassumes its condition prior to the application of the input pulse.

When input pulses are applied simultaneously at terminals 100 and 100a to drive cryotrons 66 and 66a resistive, a current shift of essentially one half the supply current occurs in both the bistable circuit 61 and the latching circuit 90. The current shift in the latching circuit allows the gate of cryotron 76 to become superconducting, whereas the gate of cryotron 74 remains superconducting, so that the resistive gate 66 in path 60 in bistable circuit 61 is now effective to shift the entire current to path 64 which is now completely superconducting. Similarly, the initial shift of one half the current from path 60 to path 64 in bistable circuit 61 allows the gate of cryotron 70 to go superconducting while cryotron 72 remains superconducting. As the entire current is shifted into path 64 of circuit 60, resistance is introduced into the gate of cryotron 72. This resistive gate causes the current then present in path 94 of latch circuit 90 to be shifted into path 92 which is then completely superconducting so that the entire current from source 93 is directed through this latter path. Thus, when the two input pulses applied at terminals 100 and 100a are terminated, the circuit has been shifted to its binary one state and the current in circuit 61 flows in path 64 and the current in circuit 90 flows in path 92.

The circuit may be switched back to its binary one state by simultaneously applying pulses at terminals 102 and 102a to drive the gates of cryotrons 68 and 68a resistive. If an input pulse is applied to one or the other of these terminals, the operation is the same as described above. The current is shifted to an equilibrium condition in either the circuit 61 or the circuit 90 in accordance with the terminal to which a pulse is applied and then re-assumes its initial state after the single input pulse is terminated.

One advantage of the cross coupling between the circuits 61 and 90 of FIGS. 2 and 3 is that it positively provides a means for latching the circuit in either of the stable states. Thus, when the circuit is in either stable state, the current in circuit 90 holds a gate conductor in circuit 61 resistive and, similarly, the current in circuit 61 holds a gate conductor in circuit 90 resistive and these resistive gate conductors are connected in the paths which are not then carrying current. As a result, with this type of positive latching connection between the two circuits, some small amount of resistance may be present without disturbing the stability of the circuit. In the circuit of FIG. 3, when a single pulse is applied to one of the input terminals only, each of the gates in one or the other of the circuits 61 and 90 becomes superconducting. The current will remain stable in one path in these circuits only if the path is entirely superconducting. The presence of resistance in the path will produce unwanted current shifting. However, as long as the resistance present is small relative to the inductance of the circuit, and the input pulses are not maintained on for a sufficient time for the unwanted resistance to cause a sufficient current shift to drive one of the gates resistive, the circuit will re-assume its initial stable state upon the termination of the single input pulse applied. In order to assure proper circuit operation, even with small amounts of resistance present, the supply current factor of the coupling cryotrons 70, 72, 74 and 76 is chosen to be as close to one as tolerances permit. It should be noted that, when the circuit is in either of its stable states, the latching feature, whereby each of the circuits 61a and 90 holds the other circuit stable, is preserved.

From the above, it can be seen that the circuit of FIG. 3 can be operated as a logical circuit which responds to the combinations of inputs applied at the input terminals. Thus, for example, regardless of the stable state of the circuit, resistance must be introduced by the applied inputs in both the bistable circuit 61 and the latching circuit 90 in order to change the stable state of the circuit. As above described, the application of inputs simultaneously at terminals 100 and 100*a* is effective to switch the circuit from its binary one state to its binary zero state. Similarly, the application of inputs simultaneously at terminals 102 and 102*a* is effective to switch the circuit from its binary zero state to its binary one state. The application of inputs to one or the other or both the terminals 100 and 100*a* at a time when the circuit is in its binary zero state, with current in paths 64 and 92, is ineffective to change the state of the circuit. Similarly, the application of inputs to either or both of the terminals 102 and 102*a* at a time when the circuit is in its binary one state with current in paths 60 and 94 is ineffective to change the state of the circuit. When the circuit is to be used as a logical circuit, terminals 100 and 100*a* may be chosen as the input terminal to which the logical inputs are applied. In such a case, terminals 102 and 102*a* receive pulses which reset the circuit after each logical operation. This resetting in such a mode of operation is preferably achieved by a single pulse applied to a single reset terminal such as 102, with the control conductors for both of the cryotrons 68 and 68*a* being connected in series with this terminal.

The circuit might also be operated as a memory element capable of being selectively addressed in a memory array. In such a case, terminal 100 serves as the binary zero input for the circuit and terminal 102 as the binary one input. Terminals 102*a* and 100*a* receive pulses simultaneously to condition the circuit to be responsive to the binary one or binary zero input. Preferably, the control conductors of cryotrons 66*a* and 68*a* are connected in series with one of these terminals and both are energized each time a pulse is applied at the terminal. For this mode of operation, it is necessary that the supply current factor of the coupling cryotrons 70, 72, 74 and 76 be between one and two. When this mode of operation is practiced, the circuit is capable of responding only when the cryotrons 66*a* and 68*a* are driven resistive and a signal is applied at the same time to either the binary one input terminal 102 or the binary zero input terminal 100. The circuit remains unchanged in its stable state when a signal is applied to either of the binary input terminals 100 or 102 at a time when the cryotrons 66*a* and 68*a* are not driven resistive. Further, the energization of the cryotrons 66*a* and 68*a* is not effective to change the state of the circuit in the absence of a pulse applied to one or the other of the binary input terminals.

Let us consider first the operation when no binary input is applied and the gates of cryotrons 66*a* and 68*a* are driven resistive at a time when the circuit is in a binary one state with the current in path 60 in circuit 61 and path 94 in circuit 90. With the gates of cryotrons 66*a* and 68*a* resistive, path 92 includes two resistive gates, the gate of cryotron 70 and the gate of cryotron 68*a*, and path 94 includes only a single resistive gate, the gate of cryotron 68*a*. At the time, before any current switching is initiated, the only resistance in the circuit 61 is that of the gate 76 which is connected in path 64. Therefore, when gates of cryotrons 66*a* and 68*a* are driven resistive, a current shift is effected in the latching circuit which causes one third of the current to be shifted from path 94 to path 92. Assuming a current supply of 15 units, there is then 5 units of current in path 92 and 10 units of current in path 94 and since each of the coupling cryotrons requires more than 7.5 units of current in its control conductor to drive its gate conductor resistive, the gate of cryotron 76 remains resistive and the gate of cryotron 74 remains in a superconducting state. Therefore, bistable circuit 61 remains in its initial binary one state with all of the current in path 60. When the pulses applied to drive gates 66 and 68*a* resistive are terminated, the gates of these cryotrons go superconducting and the only resistance remaining in the latching circuit is that of gate 70 which is maintained resistive by the current in path 60 of the bistable circuit 61. This resistance causes the current in path 92 in the latching circuit to be shifted back to path 94 and, therefore, the circuit, upon termination of the control pulses applied to cryotron 66*a* and 68*a*, re-assumes its initial state.

The operation is similar when both of the cryotrons 66*a* and 68*a* are driven resistive at a time when the circuit is in its binary zero state. In such a case, with the gates of cryotrons 72 and 66*a* in path 94 of the latching circuit resistive, the current is shifted from path 92 until two-thirds of the supply current remains in this path and one-third of the supply current is flowing in path 94. This current shift does not affect the state of either of the cryotrons 74 and 76 and there is no change in current distribution in circuit 61. Upon termination of the pulses driving the gates of cryotrons 66*a* and 68*a* resistive, the latching circuit re-assumes its initial condition with all of its current flowing in path 92 under the control of the resistance of gate 72, which gate is maintained resistive by the current flowing in path 64 of circuit 61.

When it is desired to switch the circuit from its binary one to binary zero state, both of the cryotrons 66*a* and 68*a* are driven resistive and a pulse is applied at terminal 100 to drive the gate of cryotron 66 resistive. The initial current shift effected in the latching circuit is essentially similar to that described above with the current shift tending to establish an equilibrium condition with two-thirds of the current in path 94 and one third of the current in path 92. However, at the same time, with the gate of cryotron 66 resistive, a current shift takes place in circuit 61 to approach a condition of equilibrium with half of the supply current in each of the paths 60 and 64. Since each of the coupling cryotrons 70 and 72 has a supply current factor less than two, both of these cryotrons are then superconducting and, therefore, the only resistance present in the latching circuit is that of gates 66*a* and 68*a*. The current in the latching circuit shifts to approach a condition of equal current in paths 92 and 94. The gates of cryotrons 74 and 76 are then superconducting so that the resistive gate of cryotron 66 is then effective to complete the switching of the current in circuit 61 to path 64. The gate of cryotron 72 is then resistive and a further current shift occurs in the latching circuit 90 towards a condition with two-thirds of the supply current in path 92 and one third in path 94.

As has been stated, the supply current factor of cryotrons 74 and 76 is between one and two. If the supply current factor of these cryotrons is greater than one and one half, the gate of cryotron 74 is now resistive and that of cryotron 76 is superconducting. If the supply current factor is less than one and one half, the gates of both cryotrons are now superconducting. The circuit operation is essentially the same for supply current factors less than or greater than one and one half. However, by using a supply current factor greater than one half, positive latching is provided during switching operations and, in the following description, the coupling cryotrons are taken to have a supply current factor between one and one half and two. Thus, as this current shifts toward a condition with two-thirds of the current in path 92 and one-third of the current in path 94, latching takes place, the gate of the coupling cryotron 74 remains resistive and that of coupling cryotron 76 remains superconducting, as is proper to maintain the circuit stable in the binary zero state. Cryotrons 72 is held resistive by the current from source 63 in path 64, so that when the inputs are terminated, allowing the gates of cryotrons 66, 66*a* and 68*a* to become superconducting, the current shift to path 92 of latching circuit 90 is completed.

The operation is similar when pulses are applied to drive gates 66 and 68*a* resistive and a signal is applied at a binary one terminal 102 to drive gate 68 resistive. In this case, the current shift in the latching circuit 90 and the bistable circuit 61 is similar to that described above and, upon termination of the input signals, both of the circuits are in the proper state to represent a binary one and to maintain each other stable in that state.

Thus, the circuit of FIG. 3 is switched to its binary one state in response to inputs simultaneously applied to terminals 102 and 102*a*, or to 102, 100*a* and 102*a* and is switched to its binary zero state in response to inputs simultaneously applied to terminals 100 and 100*a* or 100, 100*a* and 102*a*. The application of an input to any one of these terminals, exclusively, does not affect the stable state of the circuit. Further, the application of simultaneous inputs to either terminals 100 and 102*a*, 102 and 100*a*, 100 and 102, or 100*a* and 102*a*, does not affect the state of the circuit since, when these simultaneous inputs are applied, a current shift is produced in one or the other, but not both, of the circuits 61 and 90. Upon termination of the inputs, the circuit in which this current shift is produced re-assumes its initial stable state.

Figure 4:
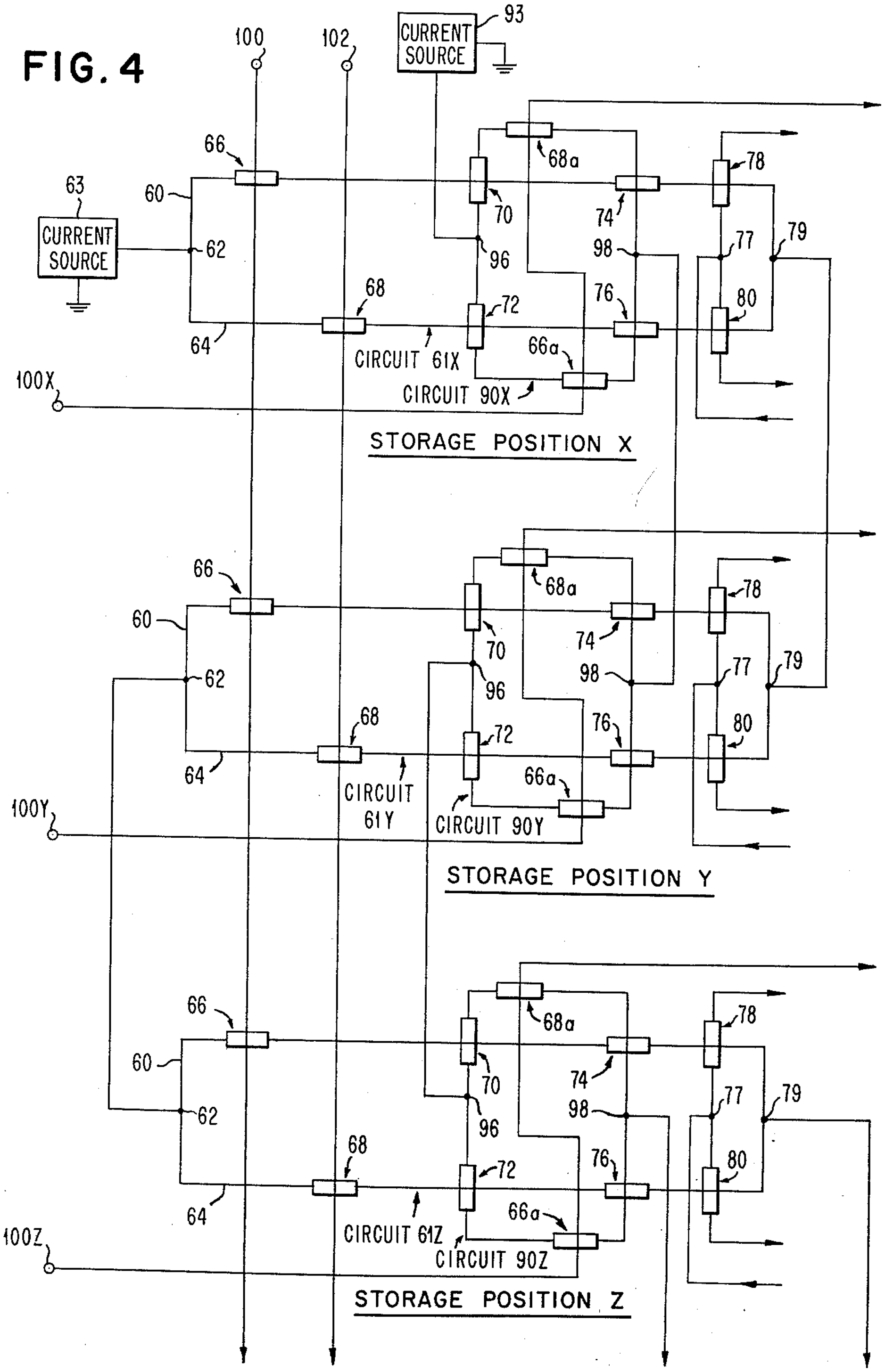
FIG. 4 is a schematic representation of a portion of a superconductor system including a plurality of the devices shown in FIG. 3.

In FIG. 4, three of the circuits of FIG. 3 are shown forming storage positions in a portion of a memory array. The circuits are part of a memory array in which there are vertical columns and horizontal rows of such circuits with the circuits in each horizontal row storing one information word. In the circuit diagram of FIG. 4, X, Y and Z storage positions are shown with the two circuits forming the X position being designated 61X and 90X, those forming the Y position being designated 61Y and 90Y and those forming the Z position being designated 61Z and 90Z. The various components within each of the bistable circuits are identified with the same designations as are used in FIGS. 2 and 3. The binary zero input for the column of the array shown is at a terminal 100 and the binary one input at a terminal 102. The particular column in which the information represented by a signal applied at either 100 or 102 is to be written, is controlled by energizing one or the other of three conditioning or selection lines connected to 100X, 100Y and 100Z. Each of these conditioning or selection lines is connected in series with the control conductors for the cryotrons 66*a* and 68*a* for the storage positions in the associated row of the memory. Thus, for example, terminal 100X is connected to a line which includes the control conductors for cryotrons 66*a* and 68*a* of storage position X. Similarly, the selection line connected to terminal 100Y includes the control conductors for cryotrons 66*a* and 68*a* of storage position Y. From the description given above with respect to FIG. 3, it is apparent that when a signal is applied to either one of the input terminals 100 or 102, in the absence of a signal applied to any one of the terminals 100X, 100Y or 100Z, none of the storage positions shown are effected. However, when a signal is applied to one of these input terminals at a time when a signal is applied at one of the terminals 100X, 100Y or 100Z to select a particular row for writing, the state of the storage positions X, Y or Z, as the case may be, is changed in accordance with an input pulse applied. Thus, for example, if a binary one representing signal is applied at terminal 102 and a signal is simultaneously applied at terminal 100Y, upon termination of these signals, storage position Y is in its binary one state regardless of the initial state of this storage device. Further, storage positions X and Z are not effected by the operation.

It should be noted that in the circuit of FIG. 4, each of the three storage devices receives the current for their bistable circuits 61X, 61Y and 61Z from a single current source 63. The terminals of the bistable circuits are connected so that these circuits are in series with this source and form a single network. Similarly, the latching circuits for the storage positions are connected in series and receive current from a single source 93. Thus, a single latching network is provided for all of the positions shown. Further, each latching circuit together with the bistable circuit to which it is coupled, provides positive stability in each of the storage positions. Further, and this is an important consideration, the entire circuit may be checked for shorts at room temperature, merely by making a continuity check between any point in the bistable circuits which receive current from source 63 when the circuit is operated and any point in the latching circuits which receive current from source 93 when the circuit is operated. If there is a short at any one of the points at which the conductors of these two different networks traverse each other, it is manifested in such a continuity check.

The output circuit for each of the three storage positions shown in FIG. 4 is represented by the pair of cryotrons 78 and 80 for each circuit. The manner in which these outputs are taken may vary in accordance with the application to which the memory is to be put. One method of arranging output circuits in a memory of this type is shown and described in copending application Serial No. 744,157, filed June 24, 1958, in behalf of H. F. Heath and assigned to the assignee of the subject application.

It should also be noted that when the tests for shorts between the various circuits shown and described above are made in the absence of connections between the circuit and the terminals of the current source, a single current source may be used to supply current to both the bistable circuit 61 and the latching circuit 91. However, as noted above, when two different current sources are employed the supply current factor of some cryotrons can be changed without affecting the supply current factor of other cryotrons. Further, in operation, the same source may be employed to supply the current for the various input and output circuits utilized.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconductor bistable device including; a first superconductive circuit; a second superconductive circuit; said first superconductive circuit including first and second current paths connected in parallel with respect to a current input terminal for said first circuit; said second superconductive circuit including third and fourth superconductive current paths connected in parallel with respect to a current input terminal for said second circuit; means coupled to said input terminals for supplying current to said circuits; means coupling said first and second circuits for causing the current distribution between the paths in each circuit to be dependent upon the current distribution between the paths in the other circuit; said coupling means including first, second, third and fourth superconductive devices each including a superconductive control conductor and a superconductive gate conductor; the gate conductor of said first gating device being connected in said first path and the control conductor of said first gating device being connected in said third path; the gate conductor of said second gating device being connected in said third path and the control conductor of said third gating device being connected in said first path; the gate conductor of said third gating device being connected in said second path and the control conductor of said third gating device being connected in said fourth path; the gate conductor of said fourth gating device being connected in said fourth path and the control conductor of said fourth gating device being connected in said second path; whereby when current supplied to said first and second circuits is flowing in the first path of said first circuit and the fourth path of said second circuit the gate conductors of said second and third gating devices are in a resistive state to positively hold the circuit stable in this state, and when current supplied to said first and second circuits is flowing in the second path in said first circuit and the third path in said second circuit the gate conductors of said first and fourth gating devices are resistive to positively hold the circuit stable in this state; and input means for selectively introducing resistance into different ones of said paths to switch said bistable device between said stable states.

2. The device of claim 1 wherein said input means includes first, second, third and fourth input gate conductors connected in said first, second, third and fourth paths, respectively.

3. A superconductor device including; a first superconductive circuit; a second superconductive circuit; said first superconductive circuit including first and second superconductive current paths connected in parallel with respect to a current input terminal for said first circuit; said second superconductive circuit including third and fourth superconductive current paths connected in parallel with respect to a current input terminal for said second circuit; a plurality of superconductor gating devices, each including a superconductive control conductor and a superconductive gate conductor; the gate conductor of a first one of said gating devices being connected in said first path of said first circuit and the control conductor of said first gating device being connected in said third path of said second circuit; the gate conductor of a second one of said gating devices being connected in said third path of said second circuit and the control conductor of said second gating device being connected in said first path of said first circuit; the gate conductor of the third one of said gating devices being connected in said second path of said first circuit and the control conductor of said third gating device being connected in said fourth path of said second circuti; the gate conductor of a fourth one of said gating devices being connected in the fourth path of said second circuit and the control conductor of said fourth gating device being connected in said second path of said first circuit; and input means for said device for selectively introducing resistance into different ones of said paths.

4. A superconductor bistable device including; a first superconductive circuit; a second superconductive circuit; said first superconductive circuit including first and second current paths connected in parallel with respect to a current input terminal for said first circuit; said second superconductive circuit including third and fourth superconductive current paths connected in parallel with respect to a current input terminal for said second circuit; a plurality of coupling superconductor gating devices, each including a superconductive control conductor and a superconductive gate conductor; the gate conductor of a first one of said coupling gating devices being connected in said first path of said first circuit and the control conductor of said first gating device being connected in said third path of said second circuit; the gate conductor of a second one of said coupling gating devices being connected in said third path of said second circuit and the control conductor of said second gating device being connected in said first path of said first circuit; the gate conductor of the third one of said coupling gating devices being connected in said second path of said first circuit and the control conductor of said third gating device being connected in said fourth path of said second circuit; the gate conductor of a fourth one of said coupling gating devices being connected in the fourth path of said second circuit and the control conductor of said fourth gating device being connected in said second path of said first circuit; and input means for changing the stable state of said device including a plurality of input superconductor gating devices each including a superconductor gate conductor and a superconductor control conductor; the gate conductor of a first one of said input gating devices being connected in one of said paths of said first circuit and the gate conductor of a second one of said input gating devices being connected in one of said paths of said second circuit.

5. A superconductor device including; a first superconductive circuit; a second superconductive circuit; said first superconductive circuit including first and second current paths connected in parallel with respect to a current input terminal for said first circuit; said second superconductive circuit including third and fourth superconductive current paths connected in parallel with respect to a current input terminal for said second circuit; means coupled to said input terminals for supplying current to said first and second circuits; and means coupling said first and second circuits for causing the current distribution between the paths in each circuit to be dependent upon the current distribution between the paths in the other circuit; said coupling means including first and second superconducting devices each including a superconductive control conductor and a superconductive gate conductor; the gate conductor of said first gating device being connected in said first path and the control conductor of said first gating device being connected in said third path; the gate conductor of said second gating device being connected in said third path and the control conductor of said second gating device being connected in said first path.

6. An electrical circuit comprising; first and second superconductive current paths connected in parallel circuit relationship with respect to a first current input terminal; third and fourth current paths connected in parallel circuit relationship with respect to a second current input terminal; means connected in said third path for controlling the state, superconducting or resistive, of a portion of said first path in response to current flow in said third path; and means connected in said first path for controlling the state, superconducting or resistive, of a portion of said third path in response to current flow in said first path.

7. An electrical circuit comprising; first and second superconductive current paths connected in parallel circuit relationship with respect to a first current input terminal; third and fourth current paths connected in parallel circuit relationship with respect to a second current input terminal; means connected in said first path for controlling the state, superconducting or resistive, of a portion of said third path in response to current flow in said first path; means connected in said third path for controlling the state, superconducting or resistive, of a portion of said first path in response to current flow in said third path; means connected in said second path for controlling the state, superconducting or resistive, of a portion of said fourth path in response to current flow in said second path; and means connected in said fourth path for controlling the state, superconducting or resistive, of a portion of said second path in response to current flow in said fourth path.

8. A superconductor logical device including; a first superconductive circuit; a second superconductive circuit; said first superconductive circuit including first and second current paths connected in parallel with respect to a current input terminal for said first circuit; said second superconductive circuit including third and fourth superconductive current paths connected in parallel with respect to a current input terminal for said second circuit; means coupled to said input terminals for supplying current to said first and second circuits; input means for applying logical inputs to said device including means for selectively driving a portion of at least one of said paths in each of said circuits from a superconducting to a resistive state; and means coupling said first and second circuits for causing the current distribution between the paths in each circuit to be dependent upon the current distribution in the other circuit; whereby the response of said device to said input means is dependent upon whether resistance is introduced into one or both of said circuits.

9. The device of claim 8 wherein said coupling means includes first and second superconductive gating devices each having a control conductor and a gate conductor; said first gating device having its gate conductor connected in said first circuit and its control conductor connected in said second circuit; said second gating device having its gate conductor connected in said second circuit and its control conductor connected in said first circuit.

10. In a superconductor bistable device including a first circuit having first and second superconductive current paths connected in parallel circuit relationship with respect to a current source and in which current flows in said first path when said device is in said first stable state and in said second path when said device is in said second stable state; a second circuit including third and fourth superconductive current paths connected in parallel circuit relationship with respect to a current source; a plurality of superconductive gating devices each having a control conductor connected in one of said circuits and a gate conductor connected in the other of said circuits for coupling said circuits; and input means for changing the state of said bistable device including first and second input superconductive gating devices each having a control conductor and a gate conductor; the gate conductor of said first input gating device being connected in said first circuit; the gate conductor of said second input gating device being connected in said second circuit; and means for applying input signals to the control conductors of said first and second gating devices.

11. In a superconductor bistable device of the type including first and second superconductive current paths connected in parallel circuit relationship with respect to a current input terminal and means for selectively introducing resistance into said first path to cause said device to assume a first stable state with current flowing in said second path or to introduce resistance into said second path to cause said device to assume a second stable state with current flowing in said first path; means for positively latching said circuit in either of said first and second stable states; said latching means including third and fourth superconductive current paths connected in parallel circuit relationship with respect to a current input terminal and a plurality of superconductive gating devices each having a control conductor and a gate conductor; said third and fourth paths being electrically insulated from said first and second paths and coupled thereto through said superconducting gating devices; whereby when said device is either in said first stable state with current flowing in said second path or in said second stable state with current flowing in said first path resistance is introduced into the other of said first and second paths under control of current flowing in one or the other of said third and fourth paths.

12. A superconductor device comprising; first and second superconductive circuits; input means for selectively introducing resistance into each of said superconductive circuits to cause said circuits to selectively assume first and second different stable states; means coupled to said first and second circuits for supplying current thereto; and means coupling said first and second circuits for introducing resistance in each circuit in accordance with the current in the other circuit to cause said circuits to change from one of said stable states to the other of said stable states only when the input means introduces resistance into both of said first and second circuits.

13. A superconductive bistable device comprising; a first superconductive circuit including first and second superconductive current paths connected in parallel circuit relationship with respect to a current terminal for said first circuit; a second superconductive circuit including third and fourth paths connected in parallel circuit relationship with respect to a current terminal for said second circuit; input means for selectively causing said device to assume a first stable state with the current in said first circuit in said first path and the current in said second circuit in said fourth path or a second stable state with current in said first circuit in said second path and the current in said second circuit in said third path; said input means including at least first, second and third input superconductive gating devices each including a control conductor and a gate conductor; the gate conductor of said first input gating device being connected in said first path; the gate conductor of said second input gating device being connected in said third path; the gate conductor of said third input gating device being connected in said fourth path; means for applying input signals to the control conductors for said first, second and third input gating devices; and means coupling said first and second circuits for introducing resistance in each circuit in accordance with the current in the other circuit; whereby said device is switched from said first to said second stable state only when signals are simultaneously applied to the control conductor for said first input gating device and the control conductor for at least one of said second and third input gating devices.

14. The invention of claim 13 wherein said circuit includes a fourth input superconductive gating device having its gate conductor connected in said second path; the control conductor of said fourth gating device being connected to the means for applying input signals to said circuit; whereby said circuit is switched from its second stable state to its first stable state only when input signals are applied to the control conductor of said fourth input gating device and to the control conductor of at least one of said second and third input gating devices.

15. The circuit of claim 14 wherein said input means comprises first, second and third input lines; the control conductor of said first gating device being connected to said first input line; the control conductor of said fourth gating device being connected to said second input line; and the control conductors of both said second and third gating devices being connected to said third input line; whereby said circuit is switched between its stable states by simultaneously applying signals to either said first and third input lines or to said second and third input lines.

16. The circuit of claim 15 wherein said means coupling said first and second circuits includes first, second, third and fourth superconductive coupling gating devices each having a control conductor and a gate conductor; the gate conductor of said first coupling gating device being connected in said first path of said first circuit and the control conductor of said first coupling gating device being connected in said third path of said second circuit; the gate conductor of said second coupling gating device being connected in said third path of said second circuit and the control conductor of said second coupling gating device being connected in said first path of said first circuit; the gate conductor of said third coupling gating device being connected in said second path of said first circuit and the control conductor of said third coupling gating device being connected in said fourth path of said second circuit; the gate conductor of said fourth coupling gating device being connected in the fourth path of said second circuit and the control conductor of said fourth coupling gating device being connected in said second path of said first circuit.

17. A superconductor circuit including a plurality of superconductive bistable storage devices; each of said superconductor storage devices including first and second superconductive circuits; input means for selectively causing each of said storage devices to assume first and second different stable states; said input means including means for selectively introducing resistance into the first and second superconductive circuits of each of said bistable devices; means supplying current to each of said first and second circuits; and means coupling the first circuit of each bistable device to the second circuit of that bistable device and coupling the second circuit of each bistable device to the first circuit of that bistable device for introducing resistance in each of said first and second superconductive circuits in accordance with the current in the other of said first and second circuits; whereby said input means is effective to change the state of said bistable devices only when it introduces resistance into each of the first and second circuits forming the device.

18. A bistable circuit comprising; first and second superconductive current paths connected in parallel circuit relationship with respect to a first current input terminal; third and fourth current paths connected in parallel circuit relationship with respect to a second current input terminal; means connected in said first path for controlling the state, superconducting or resistive, of a portion of said third path in response to current flow in said first path; means connected in said third path for controlling the state, superconducting or resistive, of a portion of said first path in response to current flow in said third path; means connected in said second path for controlling the state, superconducting or resistive, of a portion of said fourth path in response to current flow in said second path; and means connected in said fourth path for controlling the state, superconducting or resistive, of a portion of said second path in response to current flow in said fourth path; means connected to said first current input terminal for supplying current to said first and second superconductive paths; means for applying input signals to selectively introduce resistance into said first and second superconductive paths to cause the circuit to selectively assume a first stable state with current in said second path or a second stable state with current in said first path; and means coupled to said second current input terminal for supplying current to said third and fourth current paths when said circuit is in either of said stable states and interrupting said current each time an input pulse is applied to switch said circuit between its stable states.

19. The circuit of claim 18 wherein said means connected to said second current input terminal re-applies current at said second input terminal before the applied input pulse is terminated.

References Cited in the file of this patent

UNITED STATES PATENTS 2,832,897 Buck ---------------- Apr. 29, 1958